(12) United States Patent
Vandommele et al.

(10) Patent No.: US 10,152,871 B2
(45) Date of Patent: Dec. 11, 2018

(54) METHOD FOR FURNISHING A WARNING SIGNAL, AND METHOD FOR GENERATING A PRE-MICROSLEEP PATTERN FOR DETECTION OF AN IMPENDING MICROSLEEP EVENT FOR A VEHICLE

(71) Applicant: Robert Bosch GmbH, Stuttgart (DE)

(72) Inventors: Tjark Vandommele, Stuttgart (DE); Felix Wulf, Ludwigsburg (DE)

(73) Assignee: ROBERT BOSCH GMBH, Stuttgart (DE)

( * ) Notice: Subject to any disclaimer, the term of this patent is extended or adjusted under 35 U.S.C. 154(b) by 0 days.

(21) Appl. No.: 15/473,060

(22) Filed: Mar. 29, 2017

(65) Prior Publication Data

US 2017/0287307 A1  Oct. 5, 2017

(30) Foreign Application Priority Data

Mar. 31, 2016  (DE) ......................... 10 2016 205 311

(51) Int. Cl.
*B60Q 9/00* (2006.01)
*B60K 28/06* (2006.01)
*G08B 21/06* (2006.01)

(52) U.S. Cl.
CPC .............. *G08B 21/06* (2013.01); *B60K 28/06* (2013.01); *B60Q 9/00* (2013.01)

(58) Field of Classification Search
CPC ...... A61M 2021/0044; A61M 2205/18; A61M 2205/3306; B60W 2040/0872; B60W 40/08; B60W 2040/0818; B60W 2040/0827; B60W 2540/22; B60W 2540/26; B60W 2540/28; B60W 40/09; B60W 50/14; G02B 2027/0138; G02B 2027/0187; G02B 27/017; G06F 3/012; G06F 3/013; G06F 3/0481; H04N 13/044; H04N 13/0468
See application file for complete search history.

(56) References Cited

U.S. PATENT DOCUMENTS

| | | | | |
|---|---|---|---|---|
| 6,070,098 A | * | 5/2000 | Moore-Ede | A61B 5/1103 600/300 |
| 6,087,941 A | * | 7/2000 | Ferraz | G08B 21/06 340/575 |
| 6,097,295 A | * | 8/2000 | Griesinger | A61B 5/18 340/576 |
| 6,313,749 B1 | * | 11/2001 | Horne | G08B 21/06 340/575 |

(Continued)

FOREIGN PATENT DOCUMENTS

DE  102010034599 A1  2/2012

*Primary Examiner* — Fekadeselassie Girma
(74) *Attorney, Agent, or Firm* — Norton Rose Fulbright US LLP; Gerard Messina

(57) ABSTRACT

A method for furnishing a warning signal of a detected imminent microsleep event includes reading in at least one behavior pattern that represents a behavior of a driver while driving the vehicle, comparing the behavior pattern with at least one stored pre-microsleep pattern that represents an individual behavior that has taken place or is taking place prior to a microsleep event on the part of the driver, and outputting the warning signal if a predetermined relationship exists between the behavior pattern and the pre-microsleep pattern.

9 Claims, 4 Drawing Sheets

(56) References Cited

U.S. PATENT DOCUMENTS

| | | | | |
|---|---|---|---|---|
| 6,661,345 B1* | 12/2003 | Bevan | ................... | G08B 21/06 340/575 |
| 6,825,758 B1* | 11/2004 | Laitsaari | ............. | B60C 23/0433 116/34 R |
| 8,098,165 B2* | 1/2012 | Demirdjian | .............. | A61B 5/18 340/425.5 |
| 8,537,000 B2* | 9/2013 | Nakagoshi | ............... | A61B 5/18 340/425.5 |
| 9,079,526 B2* | 7/2015 | Ishikawa | ................. | B60Q 1/00 |
| 9,144,389 B2* | 9/2015 | Srinivasan | ........... | A61B 5/0408 |
| 9,198,575 B1* | 12/2015 | Blacutt | ................... | A61B 3/113 |
| 9,474,452 B2* | 10/2016 | Kochs | ................... | A61B 5/021 |
| 9,527,508 B1* | 12/2016 | Lee | ...................... | B60W 30/08 |
| 9,628,565 B2* | 4/2017 | Stenneth | ................ | B60Q 9/008 |
| 9,720,259 B2* | 8/2017 | Hart | ....................... | G02C 11/10 |
| 2002/0015527 A1* | 2/2002 | Nambu | .............. | G06K 9/00221 382/218 |
| 2009/0016252 A1* | 1/2009 | Ho | .................... | H04W 52/0283 370/311 |
| 2009/0299209 A1* | 12/2009 | Farbos | ................. | A61B 5/1103 600/544 |
| 2010/0007523 A1* | 1/2010 | Hatav | ................... | G01C 21/26 340/901 |
| 2011/0021866 A1* | 1/2011 | Iizuka | .................... | A61B 3/113 600/26 |
| 2012/0179008 A1* | 7/2012 | Burton | ................... | A61B 5/18 600/301 |
| 2013/0116856 A1* | 5/2013 | Schadeck | ............... | B60K 28/06 701/1 |
| 2013/0204153 A1* | 8/2013 | Buzhardt | ............. | A61B 5/0476 600/544 |
| 2014/0152792 A1* | 6/2014 | Krueger | ................ | A61M 21/00 348/78 |
| 2014/0292638 A1* | 10/2014 | Lee | ......................... | G06F 3/013 345/156 |
| 2014/0347265 A1* | 11/2014 | Aimone | ................. | G09G 3/003 345/156 |
| 2015/0141770 A1* | 5/2015 | Rastogi | .................. | A61B 5/746 600/301 |
| 2015/0161894 A1* | 6/2015 | Duncan | ................. | G08G 1/163 701/1 |
| 2016/0072882 A1* | 3/2016 | Ohashi | ............... | G06F 19/3418 709/219 |
| 2016/0151603 A1* | 6/2016 | Shouldice | ................ | H04R 3/00 600/28 |
| 2016/0167672 A1* | 6/2016 | Krueger | ............... | H04N 13/366 340/576 |
| 2016/0196098 A1* | 7/2016 | Roth | ...................... | B60K 35/00 715/761 |
| 2017/0098360 A1* | 4/2017 | Ribble | .................... | A61B 5/746 |
| 2017/0112433 A1* | 4/2017 | Pugh | ........................ | G02C 7/04 |
| 2017/0127980 A1* | 5/2017 | Rabb | .................... | A61B 5/1128 |
| 2017/0143253 A1* | 5/2017 | Krenzer | ................. | A61B 5/746 |
| 2017/0307907 A1* | 10/2017 | Hart | ....................... | G02C 11/10 |
| 2017/0345276 A1* | 11/2017 | Stoltz | .................... | G08B 21/06 |

* cited by examiner

METHOD FOR FURNISHING A WARNING SIGNAL, AND METHOD FOR GENERATING A PRE-MICROSLEEP PATTERN FOR DETECTION OF AN IMPENDING MICROSLEEP EVENT FOR A VEHICLE

CROSS-REFERENCE TO RELATED APPLICATIONS

The present application claims priority under 35 U.S.C. § 119 to DE 10 2016 205 311.6, filed in the Federal Republic of Germany on Mar. 31, 2016, the content of which is hereby incorporated by reference herein in its entirety.

FIELD OF THE INVENTION

The present invention relates to methods and devices for warning of an imminent microsleep event.

BACKGROUND

Warning apparatuses are intended to warn a driver of a microsleep event while driving a vehicle. The behavior prior to a microsleep event is not the same for every person, however. In order to create a microsleep early detection apparatus that functions reliably, it is important to take into account individual behavior patterns, such as the driver's individual behavior when very fatigued.

DE 10 2010 034 599 A1 describes a method in which a personalized user profile for detecting fatigue on the part of a vehicle driver is captured and stored. The user profile is made up of standard data. While driving, current data are acquired and compared with standard data. If the difference between the standard data and the current data exceeds a threshold, fatigue on the part of the driver is indicated.

SUMMARY

Example embodiments of the present invention are directed to a method for furnishing a warning signal, a method for generating a pre-microsleep pattern for detection of an impending microsleep event for a vehicle, a method for warning by way of the warning signal, a microsleep early detection apparatus that uses the method for furnishing the warning signal, a generating apparatus that uses the method for generating the pre-microsleep pattern, a microsleep early detection apparatus system that uses both methods, and a corresponding computer program.

An individual warning to a driver of a vehicle as to an imminent microsleep event can be enabled using an individual pre-microsleep pattern, i.e., a behavior of the driver prior to a microsleep event.

According to an example embodiment, a method furnishing a warning signal for detection of an imminent microsleep event for a microsleep early detection apparatus for a vehicle includes reading in at least one behavior pattern that represents a behavior of a driver while driving the vehicle, comparing the behavior pattern with at least one stored pre-microsleep pattern that represents an individual behavior that has taken place or is taking place prior to a microsleep event on the part of the driver, and outputting the warning signal if a predetermined relationship exists between the behavior pattern and the pre-microsleep pattern.

This method can be implemented, for example, in a control device, for example in software or hardware or in a mixed form made up of software and hardware.

The behavior pattern describes a time course of one or more, for example physical, parameters of the driver while driving. The pre-microsleep pattern describes a time course of one or more, for example physical, parameters of the driver while driving which in the past were followed by a microsleep event on the part of the driver.

The behavior pattern and/or the pre-microsleep pattern of the driver can advantageously represent a gaze behavior, a blink behavior, a head posture, and/or a body posture of the driver while driving. Based on parameters such as blinking behavior, for example, it is possible to establish that, if the driver's eyelids are closed for at least 1.5 seconds, a microsleep event is present. If the driver has typically exhibited, prior to the microsleep event, parameters such as a gaze behavior inclined at a specific angle for e.g., two seconds, this pre-microsleep pattern then serves as a guideline for comparison with the behavior pattern. It can accordingly be advantageous if the warning signal is generated if the behavior pattern is identical to the pre-microsleep pattern within a tolerance range. The tolerance range can be equal to a deviation of, for example, 20% of one or more of the parameters of the behavior pattern from the pre-microsleep pattern.

For the driver's safety, the pre-microsleep pattern can be ascertained in a testing laboratory under safe conditions.

The approach presented creates a method that enables reliable and particularly safe warning of a driver of an impending microsleep event based on an individual guideline for a driver in the form of the pre-microsleep pattern.

According to an example embodiment, a method for generating a pre-microsleep pattern for detection of an imminent microsleep event includes reading in the above-presented pre-microsleep pattern that represents an individual behavior that has taken place or is taking place prior to a microsleep event on the part of the driver, and storing the pre-microsleep pattern, for example, in a unit of a microsleep early detection apparatus, such as, for example, a behavior pattern storage unit of the microsleep early detection apparatus. Alternatively or additionally, the unit can be a unit attachable externally from the microsleep early detection apparatus, such as a USB stick that can be connected to the microsleep early detection apparatus. This method for generating the pre-microsleep pattern furnishes the individual comparison value, configured as the pre-microsleep pattern, for the behavior pattern for the method for furnishing the warning signal.

Advantageously, it is also possible to generate several pre-microsleep patterns that can be usable by the method for comparison with the behavior pattern. Combinations of generated pre-microsleep patterns can also be usable as pre-microsleep patterns by the method for furnishing the warning signal.

The pre-microsleep pattern and the behavior pattern can be ideally compared if, according to an example embodiment, the pre-microsleep pattern, just like the previously described behavior pattern, represents a gaze behavior, a blink behavior, a head posture, and/or a body posture of the driver while driving.

According to an example embodiment, a method for warning by way of a warning signal for detection of an impending microsleep event for a microsleep early detection apparatus system for a vehicle includes at least the above-presented steps of the method for outputting a warning signal as well as the above-presented steps of the method for generating a pre-microsleep pattern.

This warning method can advantageously both generate the pre-microsleep pattern and furnish the warning signal.

The steps of the method for furnishing the warning signal advantageously occur using results of the steps of the method for generating the pre-microsleep pattern.

According to an example embodiment of the present invention, a microsleep early detection apparatus for furnishing a warning signal for detecting an impending microsleep event for a vehicle includes an interface to a behavior sensor unit for reading in a variant of the above-presented behavior pattern; a comparison unit for comparing the behavior pattern with at least one above-presented stored pre-microsleep pattern; and a warning unit for outputting the warning signal if the predetermined relationship exists between the behavior pattern and the pre-microsleep pattern.

A microsleep early detection apparatus of this kind is configured to execute and/or activate the steps of the method for furnishing the warning signal in the corresponding units.

In accordance with an example embodiment, the interface of the microsleep early detection apparatus can be configured to read in the behavior pattern optically; in particular, the interface can be configured to read in the behavior pattern with a camera. The behavior pattern of the driver can thereby be continuously and reliably captured.

According to an example embodiment of the present invention, a generating apparatus for generating the pre-microsleep pattern for detection of an imminent microsleep event for a vehicle includes an interface for reading in a variant of the pre-microsleep pattern presented herein and the above-described unit for storing the pre-microsleep pattern.

A generating apparatus of this kind is configured to execute and/or activate the steps of the method for generating the pre-microsleep pattern in the corresponding units.

It is furthermore advantageous if the interface of the generating apparatus is also configured, as previously described with reference to the interface of the microsleep early detection apparatus, to read in the pre-microsleep pattern optically. In particular, the interface can be configured to read in the pre-microsleep pattern with a camera. The results of the two recordings can thereby be ideally compared.

According to an example embodiment of the present invention, a microsleep early detection apparatus system for warning by way of a warning signal for detection of an impending microsleep event for a vehicle has at least the features of one of the above-presented microsleep early detection apparatuses and the features of one of the above-presented generating apparatuses. A microsleep early detection apparatus system of this kind is advantageously configured to execute and/or activate both the steps of the method for furnishing the warning signal and the steps for generating the pre-microsleep pattern in the corresponding units.

These example embodiments of the approach in the form of the microsleep early detection apparatus system also allow the object on which the approach is based to be achieved quickly and efficiently.

According to an example embodiment of the present invention, a computer program product or computer program having program code, which can be stored on a machine-readable medium or memory medium such as a semiconductor memory, a hard drive memory, or an optical memory, is usable to carry out, implement, and/or activate the steps of the method according to any of the embodiments described above, in particular when the program product or program is executed on a computer or an apparatus.

Example embodiments of the present invention are depicted in the drawings and explained in further detail in the description below.

DETAILED DESCRIPTION

Figure 1:
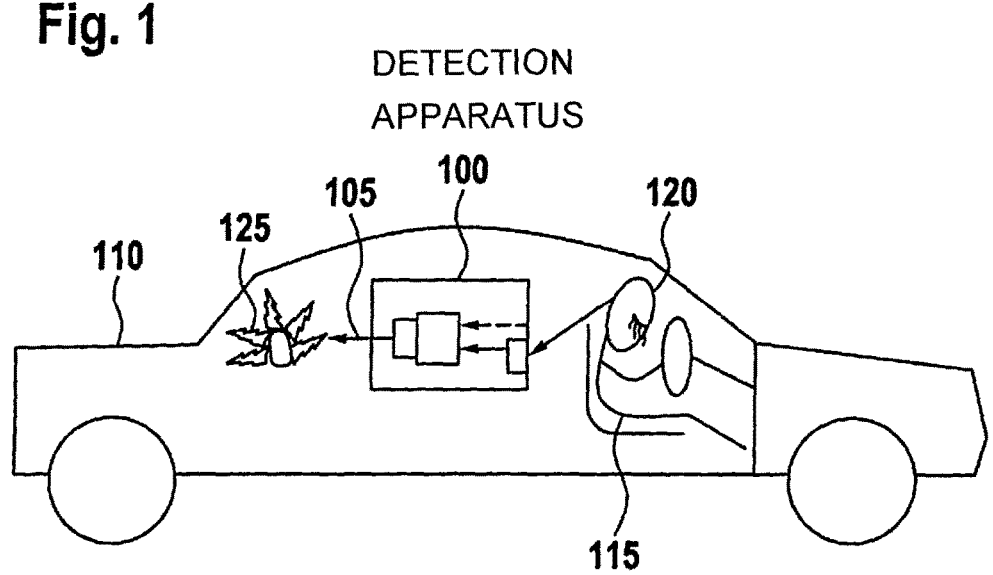
FIG. 1 schematically depicts a microsleep early detection apparatus for furnishing a warning signal for a vehicle, according to an example embodiment of the present invention.

In the description below of example embodiments of the present approach, identical or similar reference characters are used for the elements that are depicted in the various Figures which function similarly, repeated description of those elements being omitted.

FIG. 1 shows a microsleep early detection apparatus 100 for furnishing a warning signal 105 for a vehicle 110, according to an example embodiment of the present invention. According to this example embodiment, microsleep early detection apparatus 100 is disposed in vehicle 110. According to this example embodiment, a driver 115 is driving vehicle 110. Microsleep early detection apparatus 100 is configured to furnish warning signal 105 if an imminent microsleep event on the part of driver 115 is detected on the basis of a behavior pattern of driver 115. According to this example embodiment, the imminent microsleep event is detected on the basis of an individual time course of an inclined head posture of head 120 of driver 115. According to this example embodiment, the microsleep early detection apparatus is configured to furnish or output warning signal 105 to a warning device 125 of vehicle 110, which device generates according to this example embodiment, in response to warning signal 105, a loud noise in order to prevent driver 115 from falling asleep.

Figure 2:
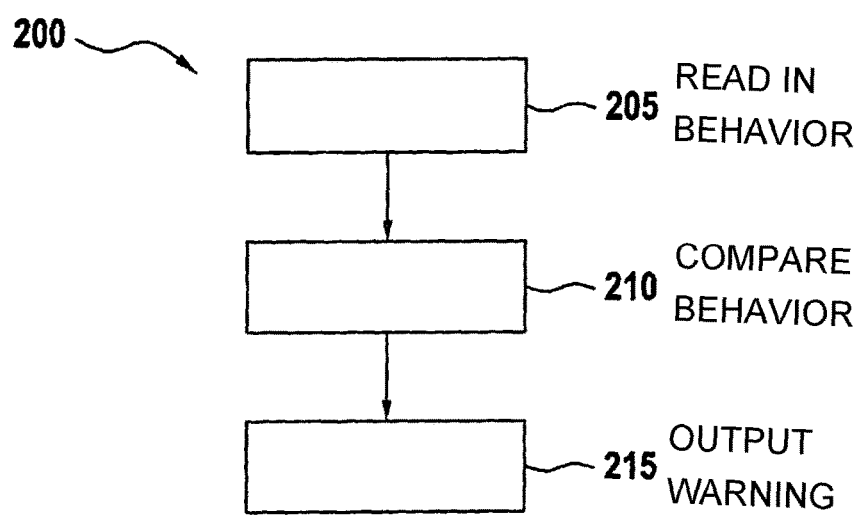
FIG. 2 is a flowchart of a method for furnishing a warning signal, according to an example embodiment of the present invention.

FIG. 2 is a flowchart of a method 200 for furnishing a warning signal, according to an example embodiment. This can be a method 200 for furnishing the warning signal for detection of the imminent microsleep event for the microsleep early detection apparatus described with reference to FIG. 1. In a reading-in step 205, at least one behavior pattern that represents a behavior of the driver while driving the vehicle is read in. In a further step 210, the behavior pattern is compared with at least one stored pre-microsleep pattern, the pre-microsleep pattern representing an individual behavior that has taken place or is taking place prior to a microsleep event on the part of the driver. In a final outputting step 215, the warning signal is furnished if a predetermined relationship exists between the behavior pattern and the pre-microsleep pattern.

According to this example embodiment the warning signal is generated, for example, only if the behavior pattern is identical to the pre-microsleep pattern within a tolerance range.

According to this example embodiment, the behavior pattern and the pre-microsleep pattern of the driver represent the individual inclined head position of the driver's head, depicted with reference to FIG. 1, over a time span. According to an alternative example embodiment, the behavior pattern and the pre-microsleep pattern of the driver can additionally or alternatively represent a different head posture, gaze behavior, blink behavior, and/or body posture of the driver over the time span and/or over a different time span while driving.

Details already described will be discussed again more specifically below with reference to FIG. 2. One aspect of the approach presented is to enable, based on personal detected patterns of the driver's behavior prior to a microsleep event in the form of the pre-microsleep pattern, a corresponding preemptive warning of the driver by way of the warning signal.

Figure 6:
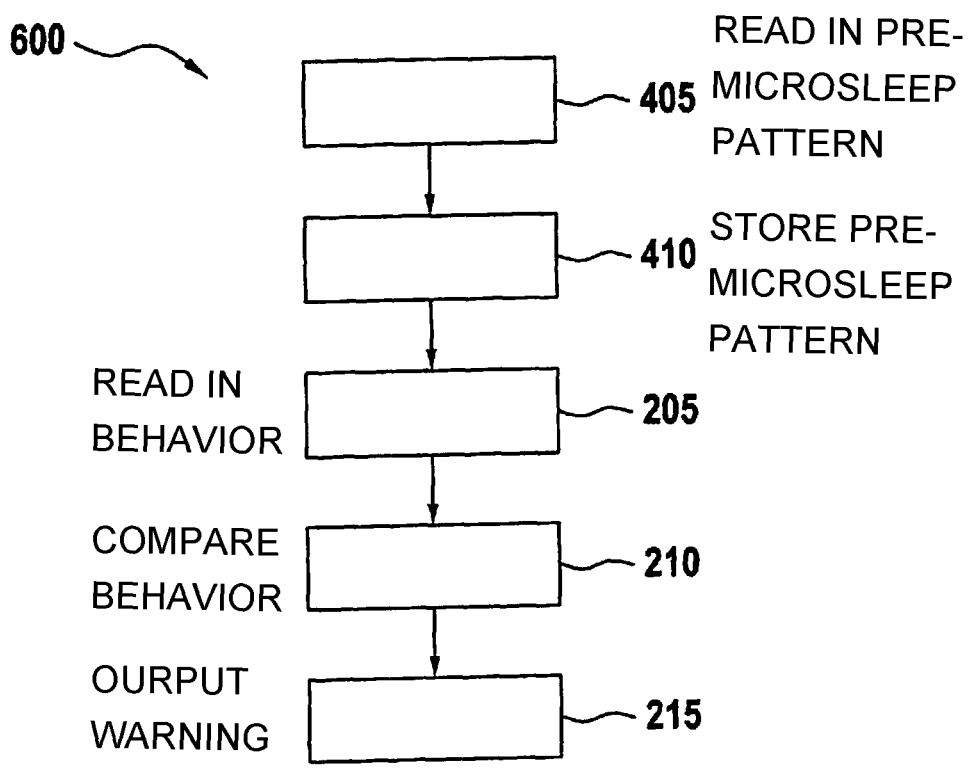
FIG. 6 is a flowchart of a method system for warning by way of a warning signal, according to an example embodiment of the present invention.

FIG. 6 describes an example of the overall system in the form of a method that is made up of two sub-methods each having several steps. Method 200 presented here, for furnishing a warning signal, can also be referred to as "Subsystem B: Preemptive Microsleep Warning." The second subsystem, subsystem A, is described by way of example with reference to FIG. 4.

In step 205, which can also be referred to as "Step 1, PPD—Personal Pattern Detection," the driver's behavior while driving is observed. In step 210, the current behavior is compared with pre-microsleep patterns in a BPD Behavior Database described with reference to FIG. 4. If a match is found, it is assumed that the driver is about to experience a microsleep episode.

Step 215 can also be referred to as "Step 2—Activating the Warning." As soon as a known pre-microsleep pattern has been detected in the preceding step 210, the warning signal is outputted, with the result that an HMI, i.e., a user interface to a warning device of the vehicle, can be activated and the warning can thereby be implemented.

Figure 4:
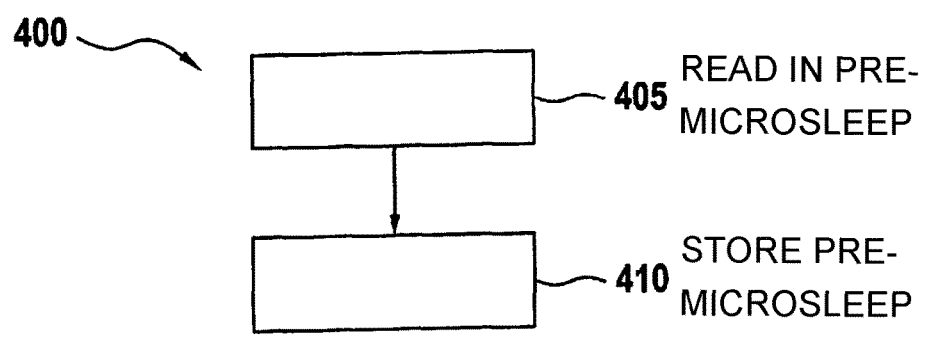
FIG. 4 is a flowchart of a method for generating a pre-microsleep pattern, according to an example embodiment of the present invention.

The approach described has the advantage that a personal system for preemptive warning of microsleep episodes is made possible, in the form of method 200, for an individual such as the driver. This is important, since it is assumed that pre-microsleep patterns such as, for example, patterns of gaze behavior and/or blink behavior exhibit very large interpersonal differences and thus cannot be defined in generally valid fashion. The method described with reference to FIG. 4 is capable of detecting and storing the personal pre-microsleep patterns for an individual. These patterns can then be used for this method 200.

Figure 3:
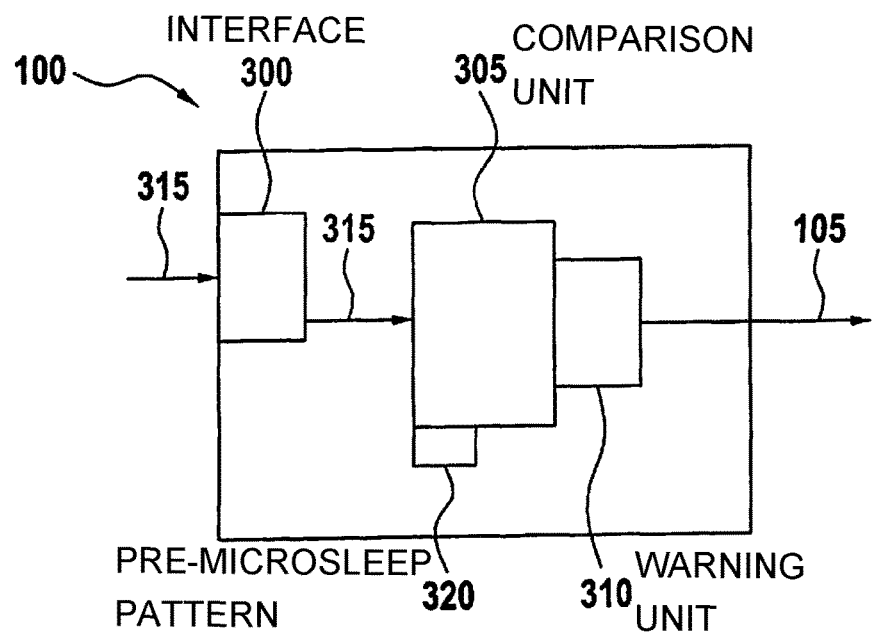
FIG. 3 is a block diagram of a microsleep early detection apparatus, according to an example embodiment of the present invention.

FIG. 3 is a block diagram of a microsleep early detection apparatus 100 according to an example embodiment. This can be microsleep early detection apparatus 100 described with reference to FIG. 1, which is configured to activate and/or execute the method described with reference to FIG. 2.

Microsleep early detection apparatus 100 has an interface 300 to a behavior sensor unit, a comparison unit 305, and a warning unit 310. Interface 300 is configured to read in behavior pattern 315 from the behavior sensor unit. Comparison unit 305 is configured to compare the behavior pattern with the stored pre-microsleep pattern 320. The warning unit 310 furnishes warning signal 105 if the predetermined relationship exists between behavior pattern 315 and pre-microsleep pattern 320. According to this example embodiment, interface 300 is configured to read in behavior pattern 315 optically, with or from a camera.

FIG. 4 is a flowchart of a method 400 for generating a pre-microsleep pattern, according to an example embodiment. This pre-microsleep pattern can be the one described with reference to the preceding Figures. In a reading-in step 405, the pre-microsleep pattern, which represents an individual behavior that has taken place or is taking place prior to a microsleep event on the part of the driver, is read in. In a further storage step 410, the pre-microsleep pattern is stored.

According to this example embodiment, the pre-microsleep pattern represents an inclined head posture of the driver's head over a time span. According to an alternative example embodiment, the pre-microsleep pattern can additionally or alternatively represent a gaze behavior, a blink behavior, and/or a body posture of the driver, over the time span and/or over a different time span while driving.

Details already described will be discussed again more specifically below with reference to FIG. 4. The above-described method 400 for generating a pre-microsleep pattern can also be referred to as "Subsystem A: Microsleep pattern learning." A detection step, which can also be referred to as "Step 1, ECD—Eyes Closed Detection" and precedes steps 405 and 410, detects whether the driver's eyes are closed. A calculation step, which can also be referred to as "Step 2, MSD—Microsleep Detection" and also precedes steps 405 and 410, calculates the time period during which the eyes are closed. Step 405, which is also referred to as "Step 3, PMSBS—Pre-Microsleep Behavior Storage," detects a microsleep episode, i.e., a microsleep event, if the eyes-closed time period calculated in the calculation step exceeds a threshold, for example 1.5 seconds.

It is advantageous that, for example, a situation-adaptive warning is not used here, but instead that, for example, the microsleep episode is defined solely by way of the period during which the eyes are closed. If a microsleep episode has been detected, the driver's behavior from a defined time window of, for example, 5 seconds before the microsleep episode is recorded, as the pre-microsleep pattern, in a behavior database (BDB) of the unit described with reference to FIG. 5. The gaze behavior and blink behavior are of particular interest here, but the head posture and body posture can also be stored. Further aspects of the driver's behavior are conceivable.

In step 410, which can also be referred to as "Step 4, PPI—Personal Pattern Identification," the recorded behavior of the driver is compared with further, already stored, behaviors of previous microsleep episodes. A search is made for repeating patterns in the behavior. If such a pattern is found, it is stored in a Behavior Pattern Database (BPD) of the unit described with reference to FIG. 5 as the pre-microsleep pattern. This pre-microsleep pattern can be used thereafter to detect microsleep episodes before they occur.

Figure 5:
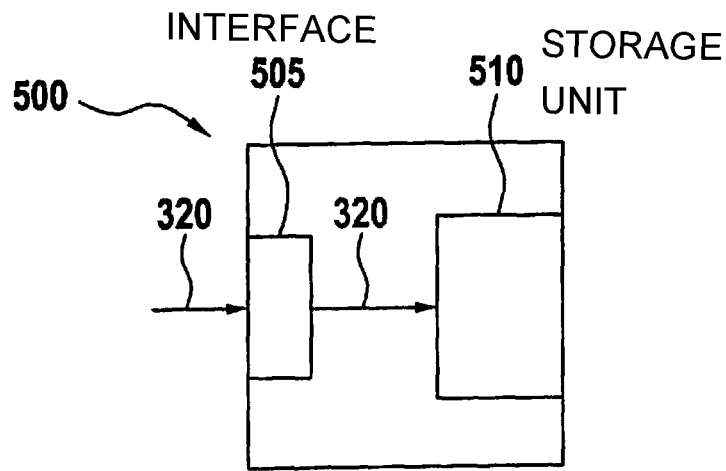
FIG. 5 is a block diagram of a generating apparatus for generating a pre-microsleep pattern, according to an example embodiment of the present invention.

FIG. 5 is a block diagram of a generating apparatus 500 for generating a pre-microsleep pattern, according to an example embodiment. This generating apparatus 500 can be one that is configured to activate and/or execute the method described with reference to FIG. 4. Generating apparatus 500 includes an interface 505 and a unit 510. Interface 505 is configured to read in pre-microsleep pattern 320, and unit 510 is configured to store pre-microsleep pattern 320.

According to this example embodiment, interface 505 is configured to read in pre-microsleep pattern 320 optically, with or from a camera.

FIG. 6 is a flowchart of a method system 600 for outputting a warning signal for a microsleep early detection apparatus system, according to an example embodiment. The method system encompasses steps 205, 210, and 215 of the method described with reference to FIG. 2 for furnishing a warning signal, and steps 405 and 410 of the method described with reference to FIG. 4 for generating a pre-microsleep pattern. In order to generate the individual pre-microsleep pattern beforehand and thus furnish it for comparison with the behavior pattern, steps 405 and 410 are executed before steps 205, 210, and 215.

Figure 7:
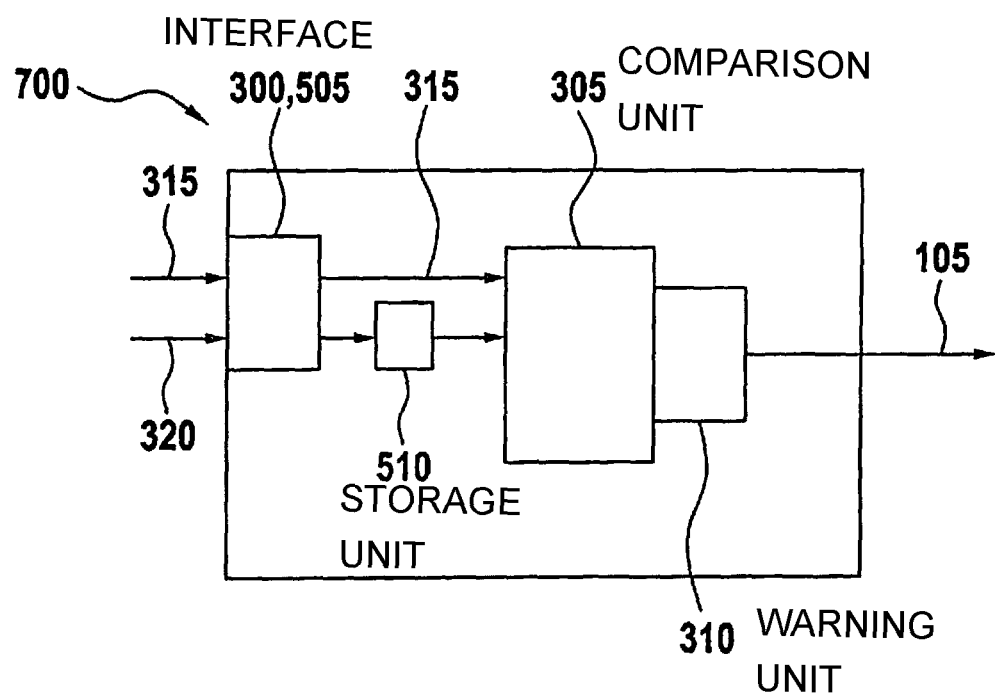
FIG. 7 is a block diagram of a microsleep early detection apparatus system for warning by way of a warning signal, according to an example embodiment of the present invention.

FIG. 7 is a block diagram of a microsleep early detection apparatus system 700 for warning by way of a warning signal 105, according to an example embodiment. This microsleep early detection apparatus system 700 can be one that is configured to activate and/or execute the steps of the method system described with reference to FIG. 6.

Microsleep early detection apparatus system 700 has the features of the microsleep early detection apparatus described with reference to FIG. 3, and the features of the generating apparatus described with reference to FIG. 5.

According to this example embodiment, interface 300 of the microsleep early detection apparatus corresponds to interface 505 of the generating apparatus.

If an example embodiment encompasses an "and/or" relationship between a first feature and a second feature, this is to be read to mean that the exemplifying embodiment according to one embodiment has both the first feature and the second feature, and according to a further embodiment has either only the first feature or only the second feature.

What is claimed is:

1. A method for warning of an imminent microsleep event, the method comprising:
    obtaining, by processing circuitry, at least one pattern of a driver while driving a vehicle;
    comparing, by the processing circuitry, the obtained pattern to at least one stored pre-microsleep pattern that represents an individual behavior of the driver that occurs prior to a microsleep event; and
    outputting, by the processing circuitry, a warning signal responsive to determining, based on a result of the comparison, that a predetermined relationship exists between the obtained pattern and the pre-microsleep pattern; and
    generating the pre-microsleep pattern by reading in, and storing the pre-microsleep pattern in a data storage;
    wherein at least one of the obtained pattern and the pre-microsleep pattern represents a gaze behavior,
    wherein the warning signal is conditional upon the obtained pattern being identical, within a predefined tolerance range, to the pre-microsleep pattern within a tolerance rang, and
    wherein at least one of the obtained pattern and the pre-microsleep pattern further represents at least one of a blink behavior, a head posture, and a body posture of the driver while driving.

2. A method for generating a pre-microsleep pattern for detection of an imminent microsleep event for a microsleep early detection apparatus of a vehicle, the method comprising:
    reading in, by processing circuitry, the pre-microsleep pattern, the pre-microsleep pattern representing an individual behavior that has taken place or is taking place prior to a microsleep event of the driver; and
    storing, by the processing circuitry and in a data storage, the pre-microsleep pattern;
    wherein at least one of the obtained pattern and the pre-microsleep pattern represents a gaze behavior,
    wherein the warning signal is conditional upon the obtained pattern being identical, within a predefined tolerance range, to the pre-microsleep pattern within a tolerance rang, and
    wherein at least one of the obtained pattern and the pre-microsleep pattern further represents at least one of a blink behavior, a head posture, and a body posture of the driver while driving.

3. A microsleep early detection apparatus for warning of an impending microsleep event for a vehicle, comprising:
    an interface to a behavior sensor unit;
    processing circuitry; and
    an output device;
    wherein the processing circuitry is configured to:
        obtain, based on information obtained via the interface, at least one pattern of a behavior of a driver while driving the vehicle;
        compare the obtained pattern to at least one stored pre-microsleep pattern that represents an individual behavior of the driver that occurs prior to a microsleep event;
        output, via the output device, a warning signal responsive to determining, based on a result of the comparison, that a predetermined relationship exists between the obtained pattern and the pre-microsleep pattern; and
        generate the pre-microsleep pattern by reading in and storing the pre-microsleep pattern in a data storage;
    wherein at least one of the obtained pattern and the pre-microsleep pattern represents a gaze behavior,
    wherein the warning signal is conditional upon the obtained pattern being identical, within a predefined tolerance range, to the pre-microsleep pattern within a tolerance rang, and
    wherein at least one of the obtained pattern and the pre-microsleep pattern further represents at least one of a blink behavior, a head posture, and a body posture of the driver while driving.

4. The microsleep early detection apparatus of claim 3, wherein the interface is configured to read in the behavior pattern optically.

5. The microsleep early detection apparatus of claim 3, wherein the interface is configured to read in the behavior pattern with a camera.

6. A generating apparatus for generating a pre-microsleep pattern for detection of an imminent microsleep event for a vehicle, comprising:
    an interface;
    processing circuitry; and
    a data storage;
    wherein the processing circuitry is configured to:
        read in, via the interface, the pre-microsleep pattern, the pre-microsleep pattern representing an individual behavior of a driver that occurs prior to a microsleep event; and
        store the read in pattern in the data storage;
    wherein at least one of the obtained pattern and the pre-microsleep pattern represents a gaze behavior,
    wherein the warning signal is conditional upon the obtained pattern being identical, within a predefined tolerance range, to the pre-microsleep pattern within a tolerance rang, and wherein at least one of the obtained pattern and the pre-microsleep pattern further represents at least one of a blink behavior, a head posture, and a body posture of the driver while driving.

7. The generating apparatus of claim 6, wherein the pre-microsleep pattern is read in optically.

8. The generating apparatus of claim 6, wherein the pre-microsleep pattern is read in with a camera.

9. A non-transitory computer-readable medium on which are stored instructions, which are executable by a computer processor, comprising:
   a program code arrangement having program code for warning of an imminent microsleep event, by performing the following:
      obtaining at least one pattern of a driver while driving a vehicle;
      comparing the obtained pattern to at least one stored pre-microsleep pattern that represents an individual behavior of the driver that occurs prior to a microsleep event;
      outputting a warning signal responsive to determining, based on a result of the comparison, that a predetermined relationship exists between the obtained pattern and the pre-microsleep pattern; and
      generating the pre-microsleep pattern by reading in and storing the pre-microsleep pattern in a data storage;
   wherein at least one of the obtained pattern and the pre-microsleep pattern represents a gaze behavior,
   wherein the warning signal is conditional upon the obtained pattern being identical, within a predefined tolerance range, to the pre-microsleep pattern within a tolerance rang, and
   wherein at least one of the obtained pattern and the pre-microsleep pattern further represents at least one of a blink behavior, a head posture, and a body posture of the driver while driving.

* * * * *